Oct. 27, 1964  W. C. WOODS ETAL  3,154,654
SPACE THERMOSTAT WITH ANTICIPATOR AND LEVELING DEVICE
Filed Aug. 1, 1960
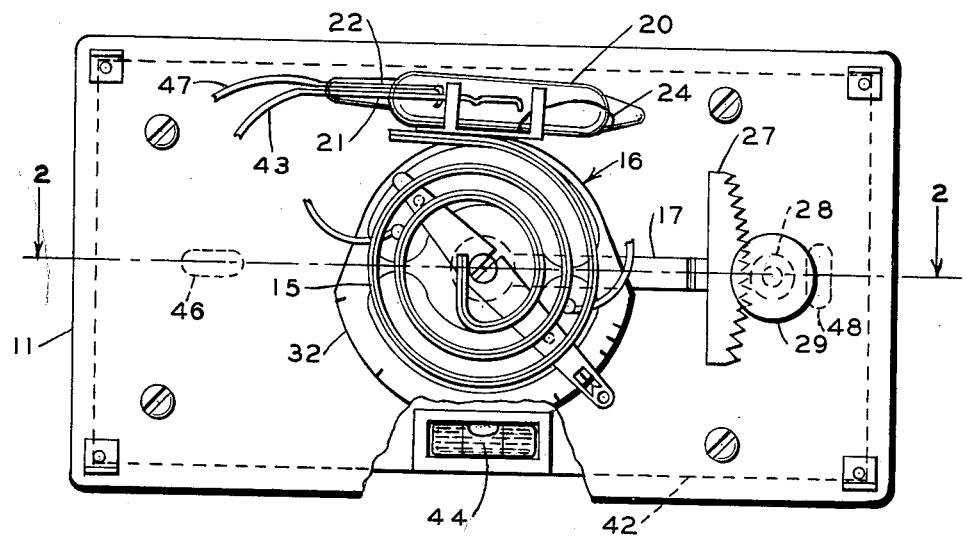
INVENTORS
WILLIAM C. WOODS
RAYMOND W. ELDRIDGE JR.
BY Charles E. Markham
THEIR AGENT

United States Patent Office 3,154,654
Patented Oct. 27, 1964

3,154,654
SPACE THERMOSTAT WITH ANTICIPATOR AND LEVELING DEVICE
William C. Woods, O'Fallon, Ill., and Raymond W. Eldridge, Jr., St. Louis County, Mo., assignors, by mesne assignments, to White-Rodgers Company, a corporation of Missouri
Filed Aug. 1, 1960, Ser. No. 46,486
4 Claims. (Cl. 200—122)

This invention relates to space thermostats, and particularly to space thermostats of the bimetallic coil type utilizing a mercury switch and more particularly to means for accurately leveling the thermostat on installation and to means for locally heating the thermostatic element as required.

There has been long and extensive use of an electrical resistance heater or anticipator for furnishing a small amount of local heat to the thermostatic element of a space thermostat when the thermostat is in the heat demand position. This slight heating of the thermostat reduces the space temperature rise required to actuate the thermostatic element from its closed to open position and thereby anticipates the subsequent delivery of heat remaining in the furnace and compensates for any delay in the response of the thermostatic element. In order to minimize heat storage in the thermostat structure, which during the "off" period of the thermostat would act to nullify the anticipation, it is imperative that the anticipator be constructed so as to have a high heat dissipation rate and a good heat transfer relationship with a substantial portion of the thermostatic element.

Inaccurate indication of the temperatures at which space thermostats utilizing a mercury switch are responding results when the thermostat is not installed in the same position, relative to the pull of gravity, as it had during factory calibration.

An object of this invention is to provide a generally new and improved space thermostat, of the type having a spirally wound bimetal coil operating a mercury switch, which includes an adjustable anticipator constructed so as to have a relatively high heat dissipation rate and a reference means whereby factory positioning of the thermostat is easily reproducible on installation.

A further object of this invention is to provide a space thermostat including a generally new and improved anticipator having a high rate of heat dissipation and being of such shape as to be capable of transferring heat to a considerable portion of the bimetallic coil.

A still further object of this invention is to provide a space thermostat including a novel anticipator which is readily adjustable to provide the desired amount of anticipation for any of the various heating systems with which it may be used.

A still further object is to provide a mercury switch-type space thermostat including a spirit level to facilitate mounting of the switch in the proper position.

Other objects and advantages will become apparent upon reading the following description in connection with the accompanying drawing, wherein:

FIG. 1 is a front view of a thermostat, with the front cover removed and a portion of the base cut away, constructed in accordance with the present invention;

FIG. 2 is a longitudinal cross-sectional view taken on line 2—2 of FIG. 1 with the front cover included;

FIG. 3 is a front view of the anticipator;

FIG. 4 is a wiring diagram of a heating control system including a thermostat constructed in accordance with the present invention.

Referring to the drawing, the thermostat includes a thermostat base 11 of insulating material. Mounted for rotation in the base is a mounting shaft 13 which has rigidly attached thereto a spirally wound bimetal strip 15 and an anticipator generally indicated at 16. Also mounted on shaft 13 between the anticipator 16 and base 11 is an adjustment arm 17. The adjustment arm 17 is press fitted on shaft 13 tightly enough so that the shaft 13 and arm 17 normally rotate together, but if the shaft 13 is held by a screwdriver applied to its slotted end, the arm 17 may be rotated relative to the shaft and consequently relative to the bimetal coil. The mounting shaft 13 is held in the thermostat base 11 by a spring clip 14 snapped into a groove formed in that portion of the shaft extending through the thermostat base 11. The spring clip 14 biases the adjustment arm 17 into slidable contact with the front side of the thermostat base 11.

The inner end of the bimetal coil 15 is fixedly attached to the forward end of mounting shaft 13 whereas its outer free end carries rigidly attached thereto a glass bulb 20. Extending through one end of the glass bulb 20 are two spaced contact wires 21 and 22. Sealed inside the bulb 20 along with the wires 21 and 22 is a blob of mercury 24 capable of electrically connecting the two wires 21 and 22 when the bulb is tilted downward in the direction of the wires. The bimetal coil 15 is constructed so that the outer free end thereof and the glass bulb 20 move in a counterclockwise direction, tilting the bulb 20 downward in the direction of the incoming wires 21 and 22 when the coil 15 responds to decreasing temperature.

The free end of the adjustment arm 17, in the preferred embodiment, carries a gear segment 27 which engages a spur gear 28 on an adjusting knob 29. Adjusting knob 29 with gear 28 is fixedly attached to a shaft 30 mounted for rotation in the thermostat base 11 and retained therein by means of a spring clip 31.

The anticipator, and electrical resistance heating device, generally indicated at 16 and shown separately in FIG. 3, is rigidly attached to the mounting stud 13 between the control arm 17 and the bimetallic coil 15. The anticipator comprises a flat, generally circular, insulating base 32 on which are fixed two, thin, flat, electrically conductive strips 33 and 34 of generally semicircular shape. The two conductive strips 33 and 34 are arranged on the base 32 in a manner to form an interrupted circle having two diametrically opposed interruptions, as clearly shown in FIG. 3 of the drawing. Conductive strips 33 and 34 are connected electrically by a centrally perforated, formed-spring, bridging bar 35 mounted for rotation on mounting stud 13 and bearing against a shoulder 36 on the mounting stud. The bridging bar 35 is provided with contacts 37 and 38 at the ends thereof and is formed in such manner as to bias contacts 37 and 38 against the respective underlying conductive strips 33 and 34. The friction between shoulder 36 and bridging bar 35, and between contacts 37 and 38 and conductive strips 33 and 34 due to the bias of the resilient bridging bar, is sufficient to maintain a fixed angular relationship between the bridging bar and the conductive strips as the shaft 13 is rotated by the knob 29 and arm 17, whereby the temperature setting may be varied without affecting the degree of anticipation.

The heating control circuit, shown in FIG. 4, includes as primary elements a power source, comprising a step-down transformer 50 having its primary winding 51 connected across a commercial power source and its secondary winding 52 supplying the required voltage to energize a magnetic actuator 54 which when energized effects operation of a furnace. The magnetic actuator 54 is electrically connected to one side of the transformer secondary winding 52 by a lead 53 and to the other side thereof through anticipator 16 and mercury switch contacts 22 and 24 by leads 43, 45, and 47. The anticipator 16 is connected in circuit by the attachment of lead 43 to one end of conductive strip 34 and by connection of lead 45 to one end of conductive strip 33 which lies diametrically opposite thereto.

The thermostat base 11 is attached, by means of four screws, to a sub-base 42 which is arranged to be mounted on a wall at installation. The sub-base 42 is provided with perpendicularly elongated slots 46 and 48 adapted to receive attaching screws. Mounted in the sub-base 42 is a horizontal glass tube 44 containing a liquid and sufficient air space to provide a clearly visible bubble. The tube is provided with spaced markings indicating the center thereof, and the tube is arranged generally parallel to the two horizontal sides of the base and sub-base.

In operation the conductive wires 21 and 22 are electrically connected by the mercury 24 as the free end of the thermostatic element 15 moves counterclockwise and tilts the glass bulb 20 in one direction in response to a decrease in temperature of the space being heated. Upon an increase in temperature the mercury 24 moves to the open position in bulb 20, disconnecting wires 21 and 22, in response to the bimetal coil being heated to the selected temperature.

It has been found to be desirable to raise the temperature of the bimetal coil 15 with the anticipator 16 three or four degrees Fahrenheit in three minutes to obtain the proper anticipation for the average heating system; however, conditions as between installations require that the amount of heating be varied to suit these conditions. A feature of this invention is the inclusion of means for varying the amount of anticipation as required or desired. Another more important feature of this invention is the broad heating surfaces 33 and 34 which face, in close, spaced relationship, a considerable portion of one side of the spirally wound bimetal coil 15, thereby providing good heat transfer relationship between the anticipator and the coil so that the required quantity of heating is accomplished with a minimum of heat output by the anticipator 16. Upon opening of the contacts 21 and 22, the broad, thin, heating surfaces 33 and 34 cool rapidly, thus minimizing "off" period heating of the bimetal coil.

The amount of anticipation may be varied by revolving bridging bar 35 about mounting shaft 13, electrically bypassing varying portions of the conductive strips 33 and 34. There is practically no heating from the anticipator when the bridging bar is in its extreme counterclockwise position with reference to FIGS. 1 and 3, and the amount of heating is increased as the bar is rotated clockwise.

The glass bulb 20 is positioned relative to the setting of the adjustment knob 29 by first holding the base 11 in the correct position, indicated by the bubble in glass tube 44 being between two marks provided, and then setting the adjustment knob 29 to indicate the temperature setting corresponding to the temperature of the bimetal coil 15 and positioning the mercury switch, by revolving shaft 13 relative to adjustment arm 17, such that a slight decrease in temperature of the coil causes the bulb to tilt and the mercury to close contacts 21 and 22.

When installing the thermostat this same relationship between bulb 20 and knob 29 will exist if the sub-base 42 is mounted in the position at which the indicating bubble is between the marks on the glass tube 44. As in the case of all bimetal thermostatic elements of proper design, the movement of the free end of coil 15 is directly proportional to temperature change so that, having once established a precise relationship between the angular position of knob 29 and the free end of element 15 at some specific temperature as indicated by adjustment knob indicia, actuation of the mercury switch will always occur when any ambient temperature, as indicated by the knob setting, occurs. It would, of course, be possible to place the glass tube 44 at any convenient place so long as a specific relationship between the position of the indicating bubble of the spirit level and the mercury switch at some predetermined temperature is established.

While the preferred embodiment of the present invention, including means for adjusting the amount of anticipation, has been shown, it may be desired to use a fixed resistance value. It may also be desired to use a single flat strip of resistive material to form a generally circular shape instead of two semicircular strips as shown.

The foregoing description is intended to be illustrative and not limiting, the scope of the invention being set forth in the appended claims.

What is claimed is:

1. In a space thermostat, a base member, a stud mounted for rotatable adjustment therein, a flat spirally-wound bimetal coil the inner end of which is rigidly attached to said stud and the outer end of which carries rigidly attached thereto a mercury switch, an electrical resistance heater comprising a flat insulating member fixedly attached at its center to said stud with one face thereof adjacent one face of said coil and two thin, flat, semicircular, electrically-conductive strips fixedly attached to said one face of said insulating member with their ends adjacent but electrically separated so as to form an interrupted circular-shaped configuration substantially coextensive with said one face of said spirally wound coil, circuit connections electrically connecting one non-adjacent end of each strip across a source of electrical energy, a diametrically-arranged bridging bar mounted for rotation at its center on said stud and engaging at its ends said semicircular conductive strips, whereby variable portions of said semicircular strips may be electrically bypassed as said bridging bar is rotated, a horizontal glass tube containing a liquid and sufficient air space to provide a clearly visible bubble mounted in fixed relationship with said base member and arranged to indicate that mounted position of the base member which positions the free end of said bimetal coil and the attached mercury switch so that equal opposite temperature changes will operate the mercury switch when said adjustable mounting stud is rotated to a preselected position.

2. In a space thermostat, a thermostat base member, a flat, spirally wound, bimetal coil adjustably mounted at its inner end on said base member and operatively connected at its outer free end to switching means for controlling a condition changing device, an electrical resistance heating means for supplying a small amount of heat to said bimetal coil comprising a flat, insulating member and two, thin, flat, relatively wide, electrically conductive strips of semicircular form lying flat against said insulating member and fixed thereto with their ends closely adjacent so as to form a heat radiating surface of slightly interrupted circular form, said insulating member being supported on said thermostat base member in such position that said thin, flat, conductive strips lie in closely spaced, face-to-face relationship with one face of said flat, spiral, bimetal coil and so that said radiating surface formed by said conductive strips is substantially concentric and coextensive with said coil, circuit connections connecting two non-adjacent ends of said semicircular strips across a power source through said bimetal-operated switching means, a diametrically arranged, conductive, bridging bar overlying said semicircular conductive strips and engaging the surface of one of said strips with each end thereof, and said bridging bar being mounted for rotational adjustment on said thermostat base member about an axis coincident with the axis of said bimetal coil and said circularly arranged heating strips, whereby the heat output of said electrical resistance heating means is varied as said bridging bar is rotated so as to shunt various portions of said semicircular conducting strips.

3. In a space thermostat, a wall plate, a base member attached to said wall plate, means for precisely locating and attaching said base member in a predetermined position on said wall plate, a horizontal stud mounted for rotational adjustment in said base member, a bimetal strip having one end attached to said stud and carrying at its other end a tiltable mercury switch, the arrangement being such that when the bimetal strip warps in response to temperature change or when said stud is rotationally adjusted the tiltable mercury switch moves arcuately in a substantially vertical plane, means including a knob mounted for rotation in said base member operative to rotatably adjust said stud as said knob is rotated, and a spirit level mounted in fixed position on said wall plate and operative to indicate the precise position of said wall plate in which equal opposite temperature changes above and below a predetermined temperature will effect opposite operative tilting of said mercury switch when said knob is rotated to a predetermined position.

4. In a space thermostat, a base member, a horizontal stud mounted for rotational adjustment in said base member, a bimetal strip having one end attached to said stud and carrying at its other end a tiltable mercury switch, the arrangement being such that when the bimetal strip warps in response to temperature change or when said stud is rotationally adjusted the tiltable mercury switch moves arcuately in a substantially vertical plane, and a spirit level mounted in fixed relationship with said base member and operative to indicate the precise position of said base member in which equal opposite temperature changes above and below a predetermined temperature will effect opposite operative tilting of said mercury switch when said stud is rotatably adjusted to a predetermined position.

References Cited in the file of this patent

UNITED STATES PATENTS

| | | |
|---|---|---|
| 2,011,610 | Bletz | Aug. 20, 1935 |
| 2,200,852 | Pond | May 14, 1940 |
| 2,262,341 | Shaw | Nov. 11, 1941 |
| 2,344,014 | Allison | Mar. 14, 1944 |
| 2,729,719 | Kronmiller | Jan. 3, 1956 |
| 2,847,536 | Bishop | Aug. 12, 1958 |

FOREIGN PATENTS

| | | |
|---|---|---|
| 692,018 | Great Britain | May 27, 1953 |